Feb. 23, 1960     H. P. RUTHERFORD     2,925,834
SHUTTLE TIPS

Filed Jan. 28, 1957     2 Sheets-Sheet 1

INVENTOR
HENRY P. RUTHERFORD
BY Strauch, Nolan & Neale
ATTORNEYS

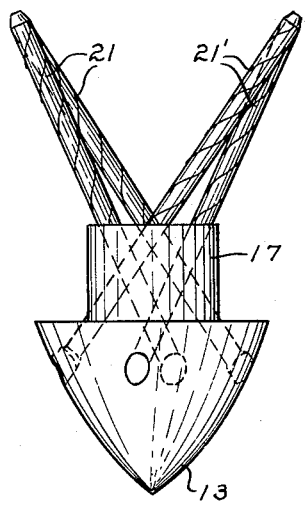
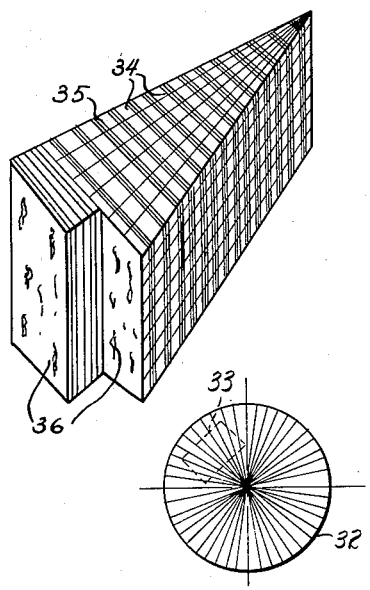
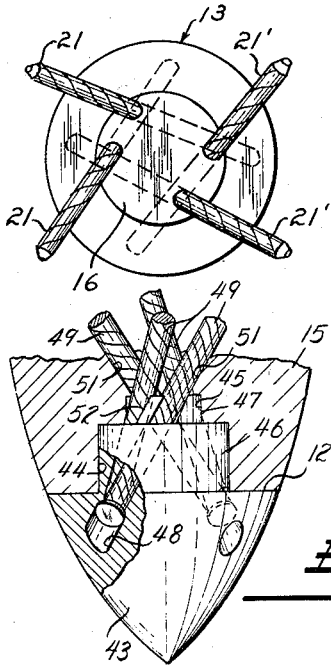
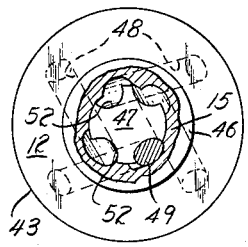

United States Patent Office 2,925,834
Patented Feb. 23, 1960

2,925,834

SHUTTLE TIPS

Henry P. Rutherford, Homestead, Fla., assignor to Multi Corporation, Miami, Fla., a corporation of Florida Application January 28, 1957, Serial No. 636,755

5 Claims. (Cl. 139—196)

This invention relates to the construction of shuttles used in textile apparatus and is particularly directed to improvements in shuttle tips.

Prior to the invention the commercial practice has been to provide in each end of the solid wooden shuttle body an axial bore that is surrounded in coaxial spaced relation by a cylindrical open-ended metal ferrule driven into the wood until flush with the end of the shuttle body. Then a rearwardly projecting rigid axial shank of a conical metal shuttle tip which is slightly oversize with respect to the bore is forced into the bore, usually coated with glue, and the combined action of the force fit and the glue relied upon to hold it there. The tightness of the force fit is limited because if forced too much the shuttle wood will split. Moreover since the impacting end of the picker stick swings through an arc and since the shuttle does not always stop in the same position at the end of its travel and the picker stick may not strike the conical tip centrally, the picker stick impact forces besides being axial to drive the shuttle across the warp impart lateral and bending stresses that increasingly tend to work the shuttle tip shank transversely of the bore. This soon results in wearing of the wooden walls of the bore especially when the wood is heated and causes such enlargement of the bore that the shank becomes loose and the tip falls out of the end of the shuttle body. This is enhanced by swelling and shrinkage of the wood with changing moisture conditions in the air. The normal life of a wooden shuttle body is only a few months in an average commercial textile machine, but statistics show that the foregoing commercial type shuttle tip has a life of only about five percent of that of the shuttle body due to the combined reactions to shrinkage, picker stick impact and forcing, which means that in the usual textile apparatus considerable time is lost and expense incurred because of shutdowns to replace defective or lost shuttle tips and to repair warp damage such as may occur where a defective tip may cause the shuttle body to be improperly driven through the warp.

The foregoing problems were solved in my copending applications Serial No. 527,716, filed August 11, 1955, for Shuttle Tip Structure; Serial No. 551,573, filed December 7, 1955, for Shuttle Tips, and Serial No. 604,503, filed August 16, 1956, for Shuttle Tips, now Patent Nos. 2,828,773, 2,828,774, and 2,828,775, respectively. In these applications there is shown novel shuttle tip structures having attachment means comprising a plurality of pins disposed at an angle to the longitudinal axis of the shuttle body. The plurality of pins act to tie in and bind the end of the shuttle body, thus preventing splitting and also distribute the shocks imparted to the shuttle tip over a larger area, instead of concentrating them at one point as was the case with the conventional single ferrule type attachment means.

Although the shuttle tip structures disclosed in my copending applications proved quite satisfactory in service and solved the aforementioned problems, they are not competitive in price with the conventional single ferrule type attachment means. This is because they are made up from an additional number of components and more labor is involved in mounting the completed structure on a shuttle body.

I have now discovered a novel unitary shuttle tip structure which is more economical than my prior structures and provides for an improved tieing and binding action at the ends of the shuttle body.

Thus, it is an object of the present invention to provide a novel unitary economical shuttle tip construction and mode of attachment to a shuttle body.

A further object of the invention is to provide a novel unitary shuttle tip construction wherein the shuttle tip is rigidly attached to a shuttle body by novel means comprising attachment pins positioned in skewed relation to the longitudinal axis of the shuttle body, to provide additional strength and resistance to splitting.

Further objects of the invention will appear as the description proceeds in connection with the appended claims and the annexed drawings wherein:

Figure 4 is a side elevation of the shuttle tip structure showing the attachment pins extending therethrough;

Figure 5 is a bottom plan view of the shuttle tip showing the attachment pins extending therethrough;

Figure 6 is an illustrative perspective view in section illustrating wood structure for discussion of the invention;

Figure 7 is a diagrammatic view illustrating how the preferred wood structure block is obtained for shuttles;

Figure 8 is a side elevation partly in section showing a different form of shuttle tip; and Figure 9 is an end view of the tip of Figure 8.

Figure 1:
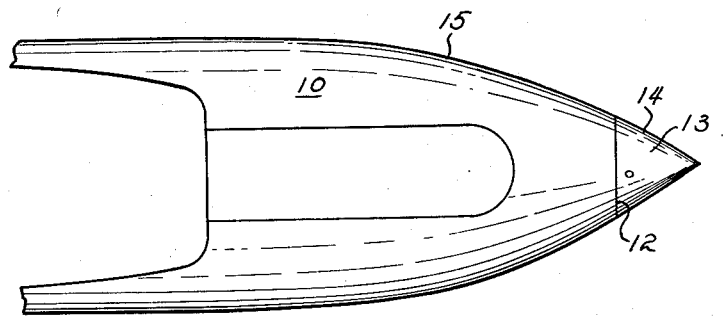
Figure 1 is a top fragmentary view of one end of a shuttle incorporating the shuttle tip of this invention.
Figure 2:
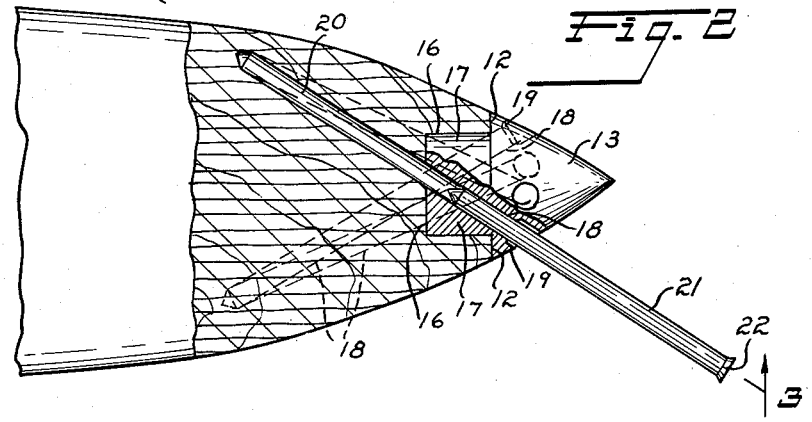
Figure 2 is an enlarged top fragmentary view partially in section showing details of the shuttle construction and shuttle tip attachment.
Figure 3:
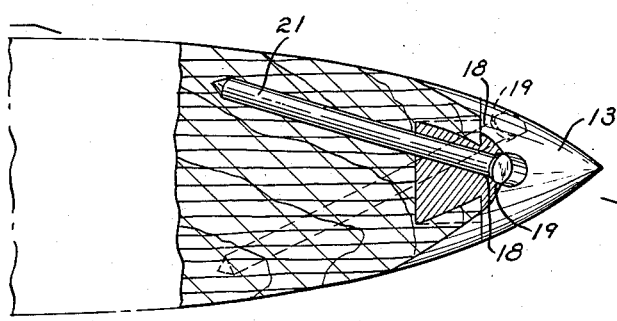
Figure 3 is taken on the line 3—3 of Figure 2.

The shuttle body 10 which is preferably a dense natural hard wood but if desired may be a laminated wood, an equivalent hard or laminated plastic, or a hard compressed fibrous material such as a compressed structure of cotton and glue, has a flat transverse end face 12. A rigid hard generally conical wear resistant end tip structure 13 is mounted on the end face 12. The external surface 14 of the cone constitutes a smooth continuation of the shuttle end surface 15. Centrally of the end face 12, a cylindrical bore 16 is formed in the solid wood or other non-metallic body 10, and a plug member 17 is mounted in that bore. Member 17 is essentially a solid cylindrical plug integral with the shuttle tip structure 13. Plug member 17 fills bore 16 and has a tight force fit therein. A plurality of straight bores 18 are drilled with their axes in generally skewed relation to the longitudinal axis of tip member 13. These bores are illustrated four in number and they are equidistantly arranged from the central axis of tip member 13 in the same skewed relation. Each bore 18 terminates in a conical countersink 19 at the outward end and emerges angularly through the bottom of the plug member 17 as shown in Figures 2, 3, 4, and 5. The angle of the bores 18 could be directed to emerge from the side of plug member 17 if desired.

The skewed relation of the bores 18 in the illustrated embodiment of my invention is a compound angle of about 15° to the longitudinal axis of the conical shuttle tip member 13 and is then swung to be about 30° to 60° to the tangent at the circumference of the conical tip at the point where the axis of a bore intersects the conical surface 14. In this manner the bores 18 are grouped and oriented substantially equidistantly from the longitudinal axis of the shuttle tip member 13. Thus the axes of the bores 18 do not intersect with each other, nor do they intersect with the longitudinal axis of the shuttle tip member 13.

Bores 20 are provided in the solid wood of the shuttle body 10 in axial alignment with the bores 18. The bores 20 are easily drilled into the shuttle body after member 13 has been secured in place by forcing plug 17 in bore 16 and bores 18 serve as drill guides.

A plurality of steel, nail like, threaded drive screw attachment pins 21 extend through bores 18 and 20 with their enlarged heads 22 seated in countersinks 19. Bores 18 are just large enough in diameter to permit forced passage of pins 21 and bores 20 are slightly undersize so that pins 21 will have a friction or threaded fit therein. It is preferable to provide pins 21 with longitudinally spiral surface ridges as shown so that they thread themselves into the wood as they advance into bores 20 and thereby greatly increase the holding action.

In the embodiment illustrated, the four attachment pins 21 are grouped in two pairs, 21—21 and 21'—21' as shown in Figures 4 and 5. The pairs of pins 21 and 21' are grouped so that the pins in each pair 21—21 and 21'—21' are closer to each other than the spacing between the pairs. Thus the points at which the pins emerge from plug member 17 form a rectangle on the end face thereof rather than a square. This arrangement is made so as to provide maximum strength to the shuttle body 10 because it is rectangular in cross-section as shown at 33 in Figure 7. In this manner, the pins 21 may be longer and extend further into the shuttle than if the pins 21 were spaced equidistantly from each other. Thus the rectangle, formed by the ends of the pins 21 when in final position in the shuttle body 10, is substantially coincident with the rectangular end cross section of the shuttle body.

If desired end surface 12 and the surface of bore 16 may be coated with a suitable cement prior to mounting of the shuttle tip member 13. Also pins 21 may be coated with adhesive prior to insertion into the aligned bores 18 and 20. Suitable cements are those containing powdered steel in a sticky resin vehicle and are readily available on the market.

Referring to Figures 7 and 8, the latter illustrates a long cross section 32 and the location of the rectangular cross-section of shuttle block 33 which is sawn out of each quarter. It will be noted that two sides of the block 33 are generally tangential to the growth rings and the other two sides are generally parallel and cross the growth rings parallel to a central radius. This quarter sawing of the wood has been found to provide wooden blocks of optimum strength to resist splitting.

Figure 7 illustrates normal wood structure wherein the annular growth rings are indicated at 34, the fibers parallel to tree height at 35 and the wood rays at 36. The wooden shuttle body structures are preferably made from quarter sawn blocks like that at 33, and the various attachment pins 21 are all so located relative to the splitting planes tangential and radially of the growth rings as to intersect those planes rather than parallel them and they thereby bind the wood structure together. For example, note the manner in which pins 21 cross the planes of growth rings indicated at 34 and the pins 21 further cross the planes of rays indicated at 36 in Figure 2. This is an important aspect of the invention. By careful selection of the sawed block and proper orientation and inclination of the pins, an assembly of optimum strength and tip life may be secured. This is true not only in natural wood, but the novel skewed positioning of the attachment pins as set forth in my invention act to bind, tie, and reinforce the shuttle bodies of laminated wood, or an equivalent hard or laminated plastic, or hard compressed fibrous materials such as a compressed structure of cotton cloth impregnated with a molding resin.

Figures 8 and 9 illustrate an embodiment of the invention wherein the shuttle tip is more firmly anchored to resist rotation about its axis due to picker stick impact, particularly where the shuttle wood is of low density.

In this embodiment the metal shuttle tip 43 is essentially the same as in the other embodiment except that the recess in the end of the shuttle body at transverse end face 12 comprises a first large diameter cylindrical section 44 and an inner smaller diameter cylindrical section 45.

Shuttle tip 43 has a central integral cylindrical projection 46 fitting within recess section 44 and a terminal cylindrical projection 47 fitting into recess section 45. Skewed bores 48 are drilled through the shuttle tip 43 for introducing self-threading nails 49 into similar shuttle body recesses 51, in the manner described above.

However, in this embodiment, see particularly Figure 9, the bores 48 exit internally as inclined grooves 52 along the periphery of projection 47, so that for a material longitudinal distance the nails or pins 49 are disposed with one side in grooves 52 and their other sides in the associated bore in the body, and pins 49 thus effectively key and interlock the shuttle tip to the wooden body 15 to prevent relative rotation between them on the shuttle axis. The shuttle tip thereby remains effectively tight even in the softer wood shuttle bodies.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a shuttle structure, a shuttle body having a transverse end face, a rigid hard generally conical wear resistant end tip structure mounted on said end face so that the adjacent surfaces of said shuttle body and end tip structure are smooth continuations of each other, a plurality of bores formed in the end of said body, a plurality of bores formed in and extending through said end tip structure aligned with the bores of the shuttle body the aligned bores being so positioned that their axes are skewed in relation to the longitudinal axis of the shuttle body, and a plurality of rigid tip structure attachment pins extending through said aligned bores.

2. The shuttle body of claim 1 in which the axis of each aligned bore is skewed in substantially the same relation to the longitudinal axis of the shuttle body.

3. The shuttle body of claim 1 in which axes of the aligned bores are oriented substantially equidistantly from the longitudinal axis of the shuttle body.

4. In a shuttle structure, a shuttle body having a transverse end face having an axially extending bore therein, a rigid hard generally conical wear resistant end tip structure having an essentially solid plug member on its base, said end tip structure being mounted on said end face so that the adjacent surfaces of said shuttle body and end tip structure are smooth continuations of each other and its solid plug member fits into the axially extending bore, a plurality of bores formed in said shuttle body about the axially extending bore, a plurality of bores formed in and extending through said end tip structure aligned with said plurality of bores in the shuttle body, the aligned bores being so positioned that their axes are skewed in relation to the longitudinal axis of the shuttle body, and a plurality of rigid tip structure attachment pins extending through said aligned bores.

5. In a shuttle structure, a shuttle body having a transverse end face, a recess in said face, a hard metal shuttle tip structure having an external surface substantially a continuation of the adjacent shuttle body surface mounted upon said body at said face, and means for securing said tip structure to said body comprising a rigid rear portion of said tip structure projecting into said recess, and a series of pins extending through aligned bores in said tip structure and the body, the inner ends of said bores in said tip structure rear portion intersecting the periphery of said rear portion so as to extend therealong as surface grooves so that the pins passing therethrough are effective to key the shuttle tip to the body and lock them against relative rotation on the axis of the shuttle.

References Cited in the file of this patent

UNITED STATES PATENTS

| | | |
|---|---|---|
| 2,683,470 | Rickenback | July 13, 1954 |
| 2,828,773 | Rutherford | Apr. 1, 1958 |

FOREIGN PATENTS

| | | |
|---|---|---|
| 511,449 | Germany | Oct. 30, 1930 |
| 599,089 | Germany | June 25, 1934 |